United States Patent
Bucci et al.

(10) Patent No.: US 9,023,423 B2
(45) Date of Patent: May 5, 2015

(54) METHOD OF DEPOSITION OF METALLIC COATINGS USING ATOMIZED SPRAY

(75) Inventors: David Vincent Bucci, Simpsonville, SC (US); Kivilcim Onal Hance, Greer, SC (US); Warren Martin Andre Miglietti, Jupiter, SC (US); Canan Uslu Hardwicke, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 1067 days.

(21) Appl. No.: 12/574,809

(22) Filed: Oct. 7, 2009

(65) Prior Publication Data

US 2011/0081480 A1    Apr. 7, 2011

(51) Int. Cl.
| | | |
|---|---|---|
| *B05C 13/00* | (2006.01) | |
| *B41N 1/24* | (2006.01) | |
| *B05D 1/12* | (2006.01) | |
| *B05D 3/00* | (2006.01) | |
| *C23C 10/28* | (2006.01) | |
| *B23K 1/00* | (2006.01) | |
| *B23K 1/008* | (2006.01) | |
| *C23C 10/30* | (2006.01) | |
| *C23C 10/32* | (2006.01) | |
| *C23C 10/38* | (2006.01) | |
| *C23C 10/44* | (2006.01) | |
| *C23C 10/52* | (2006.01) | |

(52) U.S. Cl.
CPC .............. *C23C 10/28* (2013.01); *B23K 1/0018* (2013.01); *B23K 1/008* (2013.01); *B23K 2201/001* (2013.01); *B23K 2201/34* (2013.01); *C23C 10/30* (2013.01); *C23C 10/32* (2013.01); *C23C 10/38* (2013.01); *C23C 10/44* (2013.01); *C23C 10/52* (2013.01)

(58) Field of Classification Search
USPC .......................... 427/142, 180, 452, 456, 532
See application file for complete search history.

(56) References Cited

U.S. PATENT DOCUMENTS

| | | |
|---|---|---|
| 3,761,301 A | 9/1973 | Sama et al. |
| 4,485,151 A | 11/1984 | Stecura |

(Continued)

FOREIGN PATENT DOCUMENTS

| | | |
|---|---|---|
| JP | 2001-305271 | 10/2001 |
| JP | 2002-173783 | 6/2002 |

(Continued)

OTHER PUBLICATIONS

European Search Report, Application No. 10186680.4-1215 / Patent No. 2309019 (5 pages).

*Primary Examiner* — Michael Wieczorek
(74) *Attorney, Agent, or Firm* — Nixon & Vanderhye P.C.

(57) ABSTRACT

A method of coating a metal substrate such as the components in second and third stages of gas turbine engines in order to increase the oxidation and corrosion resistance of the metal substrate under high temperature operating conditions, the method including the steps of forming a powdered mixture of a high-melt superalloy or MCrAlY component, where M comprises Fe, Ni and/or Co, and a low-melt component containing about 2-5 wt. % silicon, boron or hafnium, applying the powdered mixture to the surface of the metal substrate at room temperature using an atomized spray to form a uniform surface coating, and then heating the coated substrate surface under vacuum conditions to a temperature in the range of about 1900° F. to 2275° F. to obtain a uniform coating composition providing oxidation resistance to the underlying substrate.

14 Claims, 7 Drawing Sheets

(56) References Cited

U.S. PATENT DOCUMENTS

| | | |
|---|---|---|
| 5,073,433 A | 12/1991 | Taylor |
| 5,712,050 A * | 1/1998 | Goldman et al. ............. 428/680 |
| 5,735,448 A | 4/1998 | Draghi |
| 5,780,171 A | 7/1998 | Nissley et al. |
| 5,981,088 A | 11/1999 | Bruce |
| 6,042,898 A | 3/2000 | Burns et al. |
| 6,047,539 A | 4/2000 | Farmer |
| 6,210,812 B1 * | 4/2001 | Hasz et al. .................... 428/621 |
| 6,352,788 B1 | 3/2002 | Bruce |
| 6,391,252 B1 | 5/2002 | David et al. |
| 6,432,487 B1 | 8/2002 | Graham et al. |
| 6,497,758 B1 | 12/2002 | Hasz et al. |
| 6,610,420 B2 * | 8/2003 | Thompson et al. ........... 428/633 |
| 6,884,275 B2 | 4/2005 | Okada et al. |
| 6,968,991 B2 | 11/2005 | Renteria et al. |
| 7,029,721 B2 * | 4/2006 | Hasz et al. .................... 427/142 |
| 7,208,193 B2 * | 4/2007 | Gambino et al. ............ 427/98.4 |
| 2007/0098913 A1 * | 5/2007 | Raybould et al. ............ 427/446 |

FOREIGN PATENT DOCUMENTS

| | | |
|---|---|---|
| JP | 2002-529595 | 9/2002 |
| JP | 2005-532478 | 10/2005 |
| JP | 2007-191798 | 8/2007 |
| WO | WO 2004004953 | 1/2004 |

* cited by examiner

METHOD OF DEPOSITION OF METALLIC COATINGS USING ATOMIZED SPRAY

The present invention relates to metallic, ceramic, or composite coatings applied to substrates and, more particularly, to oxidation, corrosion, heat and wear resistant coatings for use on metal substrates exposed to aggressive environments, such as protective coatings applied to metal gas turbine engine components operating in harsh environments for long periods of time. The invention also relates to protective coatings applied to metal substrates in less aggressive, lower temperature environments, such as wear coatings on wind turbine components, as well as coatings applied to non-metallic substrates.

BACKGROUND OF THE INVENTION

Components formed of specialty materials such as superalloys are used in a wide variety of industrial applications under extreme operating conditions. In the energy generation field, working components invariably must be coated to increase their resistance to surface degradation such as oxidation, corrosion, erosion and wear over extended time periods. For example, gas turbine components exposed to temperatures over 1500° F. such as shrouds and airfoils typically have been coated during their original manufacture and/or during downtime repairs to increase the protection against oxidation, corrosion and particle erosion when exposed to an oxidizing atmosphere for long periods at high temperatures.

In the past, conventional protective coatings have been applied to metal substrates using techniques designed to optimize the microstructure and mechanical properties of the coating. However, the coatings tend to be expensive, involve complicated process controls and consume a considerable amount of downtime to coat the article. Examples of such processes include low pressure plasma spray (LPPS), vacuum plasma spray (VPS), high velocity oxygen fuel (HVOF), air plasma spray (APS), and electron beam physical vapor deposition (EEPVD). Turbine components have also been repaired using diffusion aluminides applied in vapor, pack or slurry processes. Unfortunately, many known prior art coatings tend to become brittle over time or crack due to thermal cycling and metal fatigue occurring when the turbine engine is taken in and out of service. Modifications of the coatings to make them less brittle over time often result in a lower resistance to oxidation.

The concern over wear and oxidation resistance of gas turbine components is particularly acute for metal structures formed from superalloys such as those used in multi-stage engines operating at elevated temperatures, e.g., at or above 1000° C. Without a protective coating on the exposed metal components, the oxidizing atmosphere of a gas working fluid at high temperatures can rapidly change the chemistry, and thus the properties of the metal substrate. A significant debit in material properties in one area can be very detrimental to the mechanical integrity and reliability of an entire system. Thus, various methods to prolong the life of components have been developed to cover critical component surfaces with protective coatings. Although the presence of aluminum in protective coatings improves oxidation resistance, excessive aluminum can also decrease the coating ductility, resulting in cracking during prolonged service and eventual loss of the initial benefits of the coating.

Most oxidation-resistant coatings used with superalloys comprise alloys having the general formula MCrAlY, where M includes iron, nickel, and/or cobalt. Preferably, the coatings are applied as the final layer with a smooth, uniform and controlled thickness in order to achieve maximum life and aerodynamic efficiency. Conventional thermal spray techniques that have been used to apply such coatings have positive and negative attributes, depending on the operating environment, component size, and nature of the working fluid. VPS applications, for example, are useful when the final protective coating must be free of metal oxides.

VPS and HVOF techniques, on the other hand, are less effective in applying coatings to regions of a substrate that are inaccessible due to physical limitations of the spray equipment which may be too large or cumbersome to use in small areas to have a line of sight gun angle for reasonable deposition rates and an acceptable microstructure. Most thermal spray processes also include one or more masking steps that can be costly and time-consuming in carrying out localized repairs. Other known coating systems likewise tend to be expensive, require complex process controls and take considerable down time to effectively and reliably coat target components.

BRIEF DESCRIPTION OF THE INVENTION

The present invention provides a new method of coating substrates, such as gas turbine engine components exposed to harsh operating environments, in order to increase the oxidation resistance of substrates at high temperature. An exemplary method according to the invention comprises the steps of forming a powdered mixture of a high-melt superalloy component and a low-melt braze binder component, applying the powdered mixture to a surface of the substrate at room temperature using an atomized spray to form a coating of substantially uniform thickness on the substrate surface, and then heating the substrate to a temperature sufficient to impart strength and oxidation/corrosion resistance to the coating.

In one embodiment, the method utilizes a powdered mixture of a high-melt superalloy component or an MCrAlY coating, where M comprises Fe, Ni and/or Co, and a lower-melting component comprising silicon, boron, hafnium or gold. The heating step occurs under vacuum conditions at a temperature in the range of about 1900° F. to 2275° F., thereby forming a liquid phase in which the higher melting powders become suspended and develop a metallurgical bond by liquid phase sintering. The present invention has particular advantages when used to repair metal substrates of gas turbine engine components.

BRIEF DESCRIPTION OF THE DRAWINGS

FIG. 6 also includes a time/temperature graph similar to that shown in FIG. 6 corresponding to the same series of photomicrographs;

DETAILED DESCRIPTION OF THE INVENTION

The present invention provides a new, cost effective and rapid method for depositing coatings on substrates exposed to extreme conditions such as those encountered in gas turbine engines. An exemplary process according to the invention uses an atomized spray technique to apply a metallic coating at room temperature (with or without specialty gases) by depositing a controlled amount of a resistant coating containing a prescribed amount of a lower melting compound to metal substrates such as turbine nozzles, blades or other components. The coated items are then subjected to a vacuum heat treatment under the controlled process conditions described below.

Significantly, the method according to the invention does not involve using flame or metal powder suspensions typical of prior art coating techniques, but instead uses heat treatment in a vacuum furnace under carefully controlled time/temperature conditions to enable the formation of a uniform metallurgical bond on the metal substrate surface. As a result, the method is particularly useful for coating all gas path surfaces of turbine components in a cost effective and timely manner. The same technique can also be used to coat an entire article or provide a supplemental coating ("build up") on previously coated components.

An exemplary method of coating a metal substrate in accordance with the invention includes the following basic steps. First, a powder mixture is formed containing a high-melt superalloy component or an McrAlY powder where M comprises Fe, Ni or Co, and a lower-melting component containing silicon, boron or hafnium. Exemplary MCrAlY compositions include, but are not limited to, those described in commonly owned U.S. Pat. No. 6,730,413 (Schaeffer et al "Thermal Barrier Coating") and U.S. Pat. No. 6,610,420 (Thompson et al "Thermal Barrier Coating system of a turbine Engine Component"). The resulting powder mixture is applied to the surface of the metal substrate at room temperature using an atomized spray to form a smooth, uniform coating of precise thickness on the substrate surface.

The coating can also be applied using a "salt and pepper" technique or as a paste composition. With a salt and pepper technique, the powder is applied dry to a component surface which has an adhesive applied to the surface to secure the powder. The powder is then burned off during the furnace cycle. The coated substrate surface typically is heated under vacuum conditions (about 5×10−4 torr) to a sustained temperature that is about 25 to 150° F. above the liquid state of the lower melting compound, usually in the range of about 1900° F. to 2300° F. At this stage of the process, the lower melting compound is in a liquid state, while the higher melting component remains suspended in the liquid phase. The lower-melting component preferably comprises silicon in an amount of about 2-12 wt. %. Silicon acts as a melt point depressant in the lower-melting component and also provides improved oxidation resistance to the final coating. An alternative lower melting component would be gold (Au).

The coating powder applied to the substrate thus comprises a blend of a high-melt component with a lower-melting component. Since the coating is applied at room temperature, a binder is used to assist in adhering the coating powder adhere to the substrate surface. The binder burns out during vacuum heat treatment. The ratio of the high-melting component to the lower-melting component is adjustable with the amount of the high-melt component ranging between 10-60 wt. %, with the balance being the lower-melting component. The coating is applied in the "green" state and then vacuum treated at temperatures typically necessary for a full braze (e.g., 1900-2275° F.). The resulting layer forms a novel microstructure having the added advantage of significant oxidation and corrosion protection for nickel and cobalt alloys in high temperature operating environments.

An air atomized spray process can be used to apply coating formulas according to the invention to a turbine bucket or nozzle (or selected portions thereof) in a matter of minutes rather than hours. An exemplary coating works in the following manner. A superalloy or an MCrAlY coating is mixed with another compound of lower melting point. The lower melting component could be a chemistry conventionally used for brazing superalloys. The melt point depressant in a braze alloy typically consists of B, Si, P, etc. The role of Si in the invention is two fold. First, it acts as the melt point depressant in the lower melting component. Second, it improves the oxidation resistance of the coating. Since the coatings according to the invention are applied at room temperature, a binder is used in effect as a "glue" so that the powder will remain on the substrate surface until the metallurgical bond is formed during the vacuum heat treatment cycle. The binder then burns out during the vacuum heat treatment.

In the process according to the invention, the higher melting powder is mixed with a lower melting powder and thus the final powder to be applied becomes a blend of two compounds with different melting points. As one example, mixing 50% of (Ni-8Cr-10Al) with 50% of (Ni-12Cr-2Al-4Si) forms a blended composition having two different melting points. Notably, it has been found that a substrate coating having the same basic chemical composition but not based on a blend of two separate compounds (e.g., Ni-10Cr-6Al-2Si) cannot serve as an acceptable substitute and will not provide the benefits of the present invention, even though the final chemical composition of the applied coating is essentially the same.

In one embodiment, the system according to the invention is heated to a temperature above the liquids of the lower melting constituent and maintained at that temperature for a prescribed duration. At that point, only the lower melting component will be in liquid state. The lower melting component surrounds the higher melting powder particles to form a bond by liquid phase sintering. The temperature is then decreased about 150-200° F. and maintained at lower temperature for a predetermined time to allow for diffusion to homogenize the final coating composition.

The protective coatings detailed below can serve either as an overlay or as the metallic bond coat itself in a TBC system. The process can also be used for local repairs on smaller component parts, thereby avoiding the need to completely strip and recoat components, or to provide a "buildup" coating on critical turbine component parts carried out manually or through the use of robotics, depending on the area coated. The process can thereby replace complex aluminizing and chromizing methods by dramatically reducing repair cycle times and coating cycle costs. The invention also has advantages when used on turbine components that do not require HVOF or VPS quality coatings for full life. An exemplary embodiment of the present invention for creating oxidation-resistant coating materials begins by mixing a high-melt superalloy or MCrAlY-type component that includes at least one metal selected from the group consisting of nickel, cobalt, iron with a low-melt component containing a melting point depressant such as silicon or gold. The lower melting composition typically comprises at least about 40% by weight nickel and a melt point depressant such as silicon. The resulting powder is then applied with a binder component to a metal substrate using a thermal spray process at room temperature.

The new coating composition is applied in the "green" state and then heat-treated at temperatures necessary for metallurgical bonding (1900 to 2275° F.). The resulting layer, as applied in a spray operation, provides increased protection for nickel, cobalt and iron-based alloys against oxidation and corrosion. As noted above, the use of silicon in the prescribed amounts achieves significant, unexpected benefits. Normally, silicon operates as a melting point depressant in brazing operations. Here, however, silicon provides oxidation and corrosion resistance in addition to serving as a melting point depressant. Other melting point depressants do not provide the same oxidation and corrosion resistance. The silicon content is maintained within a prescribed weight percentage range (preferably 2-5 wt. %) in order to avoid creating a brittle coating. After the initial coating is applied, the heat treatment includes a step to 'burn out' the binder material that was used to help "wet" the substrate surface when first applied. Exemplary brazing compositions according to the invention thus use a combination of high and low melt starting materials at varying weight percentages, i.e., ranging from 10% to 60% of the high-melt component.

Figure 1:
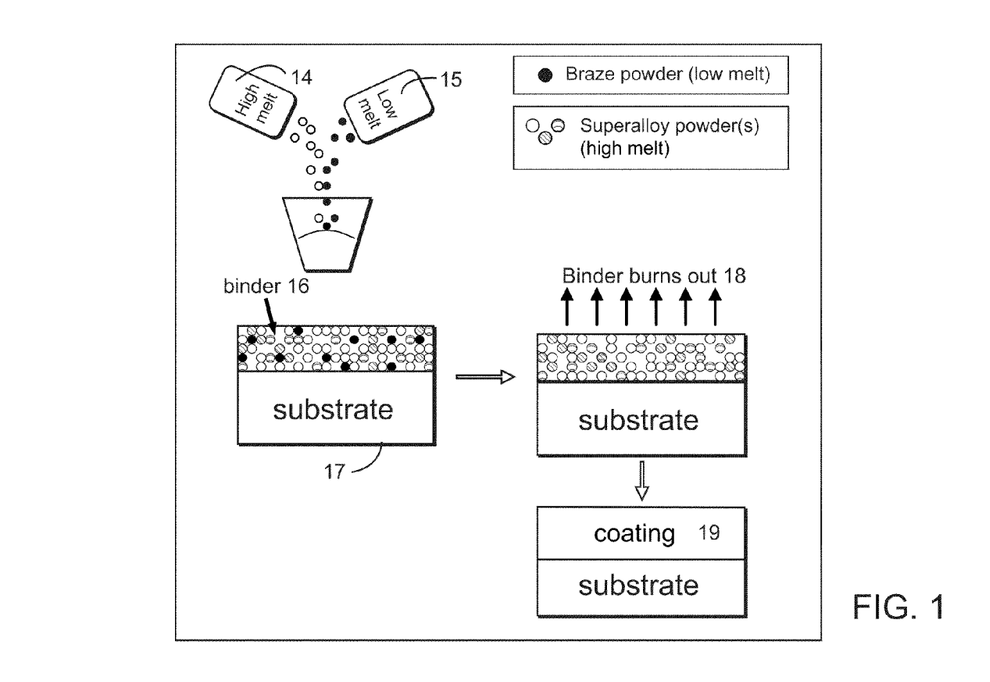
FIG. 1 is block flow diagram of the basic process steps for a conventional braze coating application in which the present invention can be employed.

Turning to FIG. 1 of the drawings, a simplified process flow diagram showing the basic steps for depositing metallic coatings containing silicon using an atomized spray technique is shown generally as 10. The initial atomized spraying 11 takes place at room temperature in air, followed by vacuum brazing 12 in accordance with the heating cycle described below. The use of an atomizer type spray at room temperature has certain advantages in the context of the present invention, including the fact that the process combines a brazing operation (typically used to repair substrate cracks) with an integral protective coating that provides the significant environmental benefits described above (e.g., increased oxidation resistance). The coating is more compatible with braze-repaired components in comparison to other coatings such as some diffusion aluminides. After the coating application and heating cycle are completed, the initially coated product undergoes an optional mechanical surface finishing treatment at 13 to render the final product ready for use.

Figure 2:
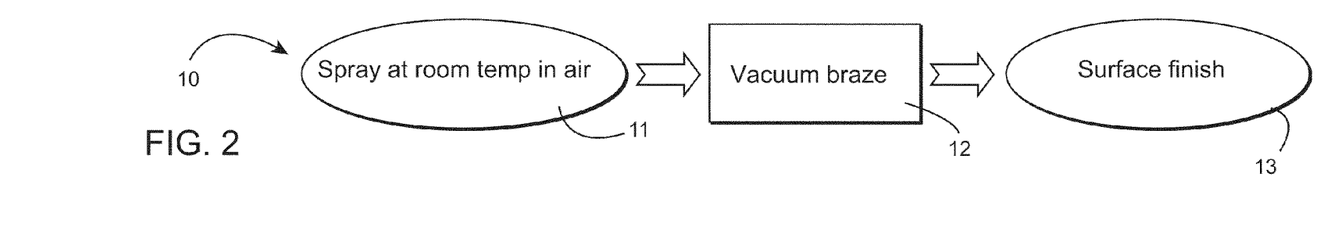
FIG. 2 is a simplified process flow diagram illustrating the basic steps used to form and deposit metallic coatings using the atomized spray technique and subsequent treatment steps according to the invention.

FIG. 2 likewise depicts a simplified process flow diagram for the subject invention. A mixture of a high-melt component 14 (typically a superalloy or an MCrAlY) and low melt powder 15 (preferably containing about 2-5 wt. % silicon) are combined with binder material 16 to hold the powder in a "green state" when applied to substrate 17 at room temperature, again without using a thermal spray technique. The coated substrate is then heat treated as described in connection with FIGS. 4 and 6 which burn off binder material 18 in the original mixture leaving the coating 19 adhered to the substrate surface, (see FIG. 5).

Figure 3:
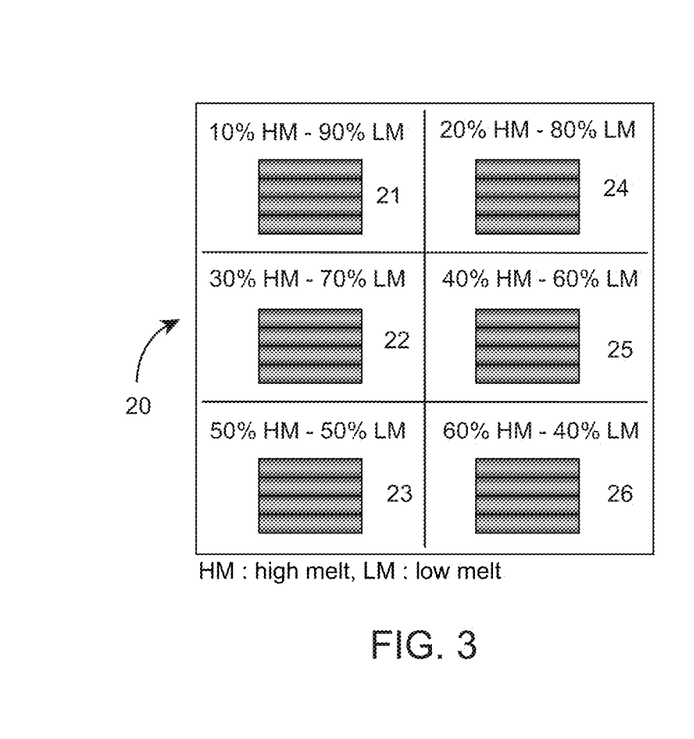
FIG. 3 depicts various coating compositions of silicon at different levels using in the brazing process according to the invention based on variations of the low and high-melt constituents described herein.

FIG. 3 depicts various coating compositions for use in the brazing process according to the invention having different amounts of low and high-melt components, with the high-melt component ranging from 10% to 60 wt. % and the corresponding low melt component ranging from 90 wt. % to about 40%. Notably, all of the combinations in FIG. 3 exhibit a significant improvement in oxidation resistance when tested at nominal operating temperatures over a period of about 1000 hours.

Figure 4:
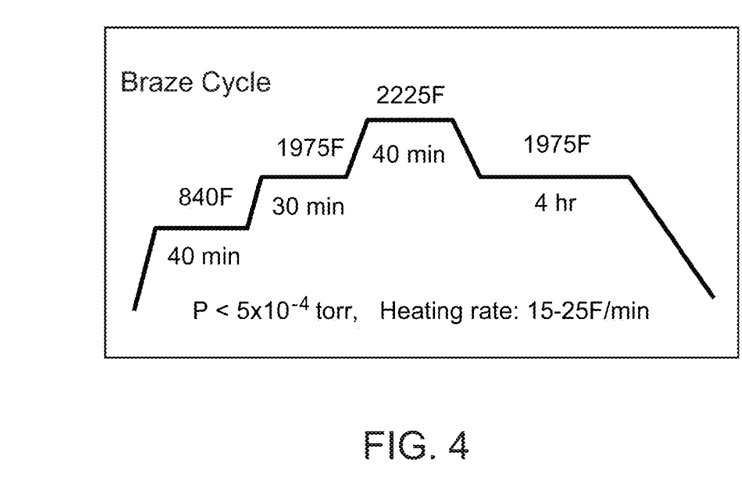
FIG. 4 is a time versus temperature graph of an exemplary braze cycle according to the invention performed under constant vacuum conditions and a constant heating rate for different low and high-melt components.

FIG. 4 is a time versus temperature graph of an exemplary braze cycle according to the invention performed under constant vacuum conditions (with the pressure maintained below $5 \times 10^{-4}$ tort) and a constant heating rate (15-25° F. per minute) for different mixtures of low and high-melt components. FIG. 4 shows the highest threshold temperatures achieved during the heating cycle and corresponding heating periods at the different specified temperature levels. In an exemplary embodiment, the step of heating the coated substrate surface in stages occurs uniformly and over a period of about four to six hours. Different heating methods can be used to carry out the process according to the invention, including conventional furnace treatment, as well as electron beam, laser or even plasma heating when the component to be coated cannot be heated to the higher temperatures necessary to sinter the coating deposit.

Figure 5:
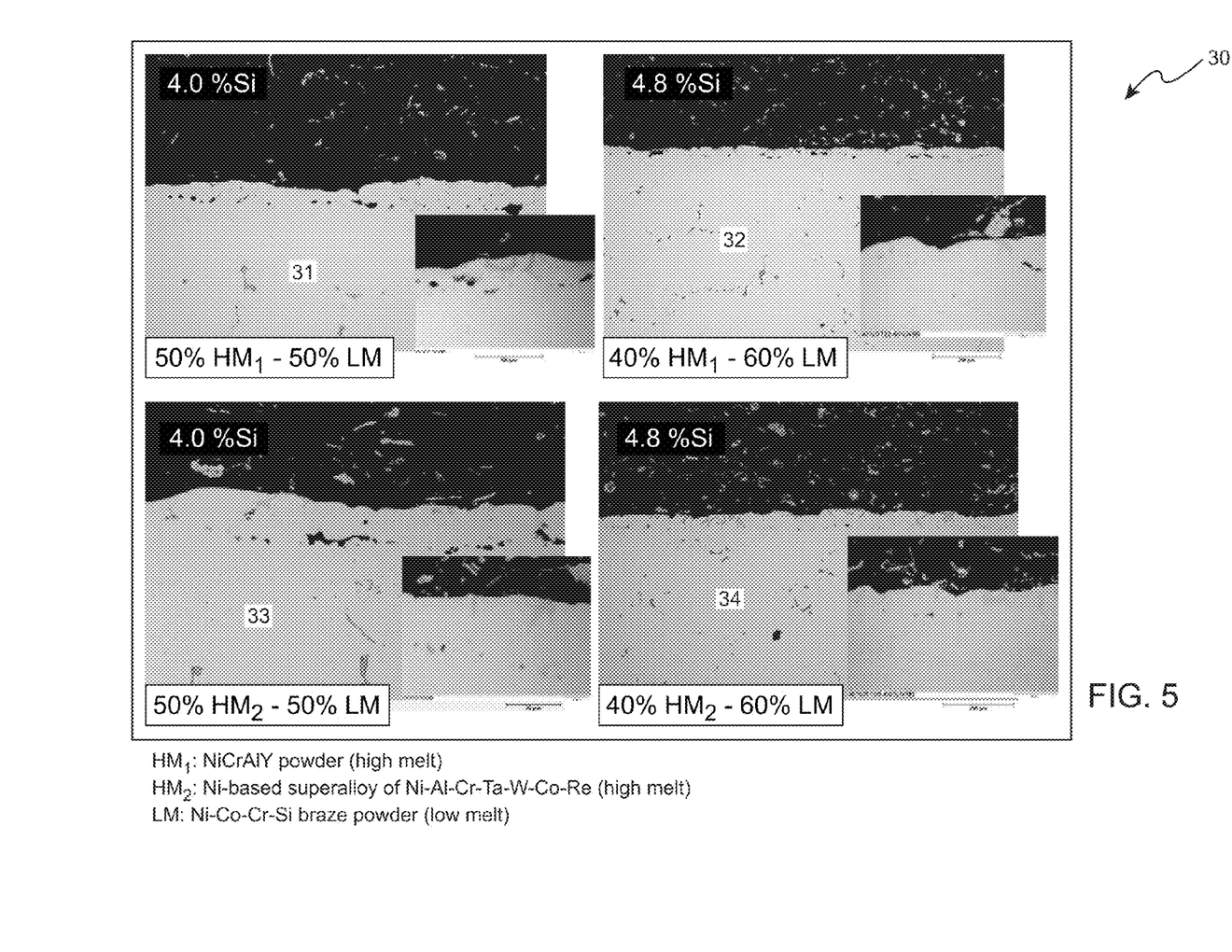
FIG. 5 shows a series of photomicrographs of exemplary coatings in accordance with the invention with varying amounts of silicon in different low and high-melt components.

FIG. 5 shows a series of photomicrographs 30 depicting exemplary coatings in accordance with the invention with different amounts of silicon and varying low and high-melt components, identified by photomicrographs 31, 32, 33 and 34. The designations "HM" (high-melt) and "LM" (low melt) identify the various high and low melt compositions, namely "$HM_1$" is a NiCrAlY powder (high-melt); "$HM_2$" is a Ni-based superalloy of Ni—Al—Cr—Ta—W—Co—Re (high-melt); and "LM" is a Ni—Co—Cr—Si braze powder (low melt). The microstructural properties observed during the tests indicate that the mixture of 40 wt. % high-melt and 60 wt. % low melt provide a uniform coating layer with minimum porosity (and hence improved oxidation resistance).

Figure 6:
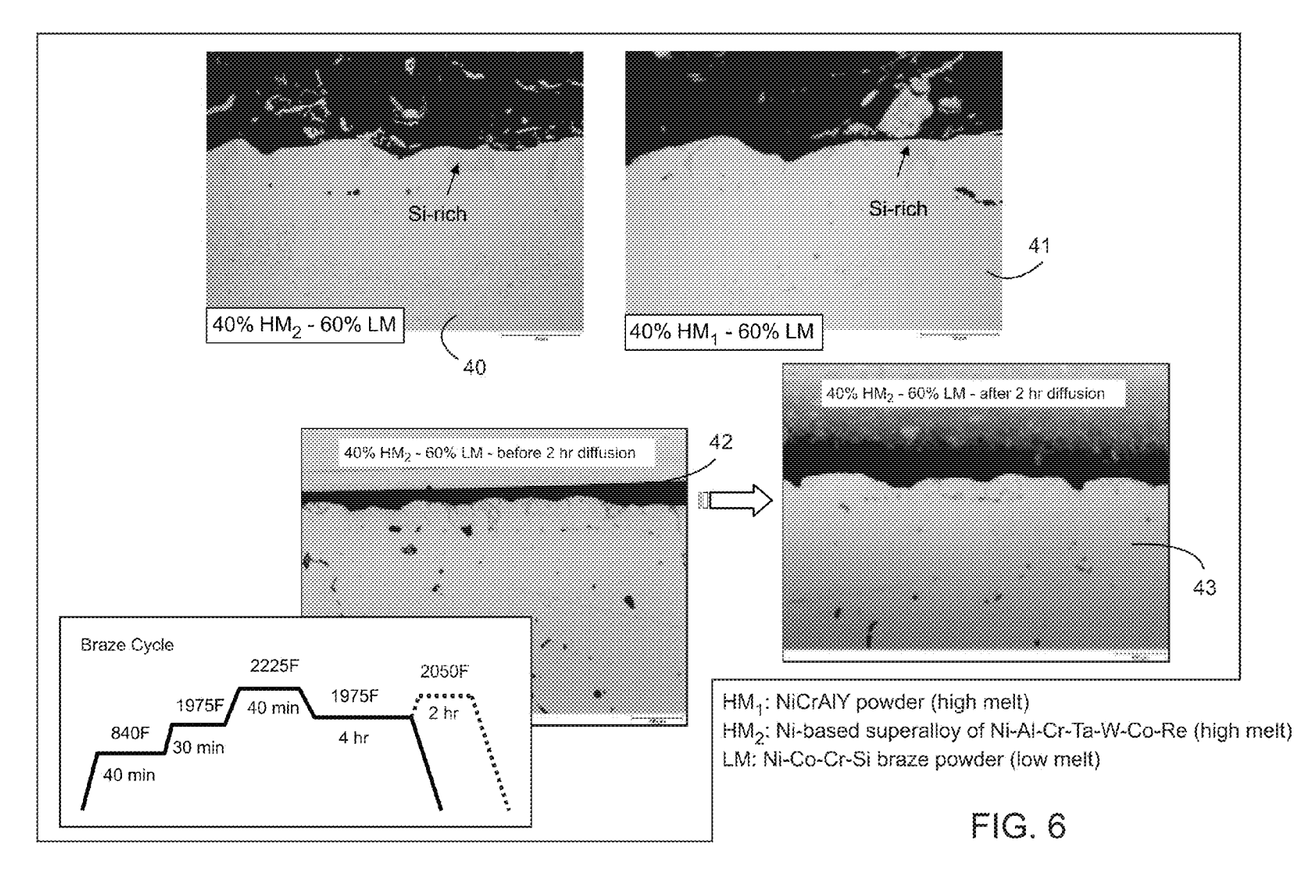
FIG. 6 shows a series of photomicrographs reflecting the observed physical change that occurs in an alternative embodiment of the coating method according to the invention.

FIG. 6 shows a series of photomicrographs 40 through 41 for coating compositions containing 40 wt. % high-melt and 60 wt. % low melt, again reflecting the observed physical change that occurs after heat treatment of the coating compositions applied to the substrate. In particular, the electron microprobe analysis in the photomicrographs reveals the formation of a silicon-rich second phase. Thus, in this further embodiment, the silicon-rich phase is mitigated by an additional heating cycle at high temperature for an additional period of time, resulting in an improvement in the size and uniform distribution of the silicon in the second phase, without any perceived increase in brittleness of the final coating. The improved structure is reflected in the photomicrographs labeled 42 and 43 and in FIG. 6.

FIG. 6 also includes a time/temperature graph similar to that shown in FIG. 4 regarding the alternative method according to the invention. As photomicrographs 42 and 43 in FIG. 6 indicate, the additional heating cycle of two hours at a sustained temperature of 2,050° F. resulted in an improvement in size and particle distribution of the silicon component and thus an improvement in overall oxidation resistance of the end product. A difference can be seen in the visible distribution of particles in photomicrograph 42 (40 wt. % high-melt and 60 wt. % low melt before the additional two-hour diffusion period) as compared to the same coating after a two-hour diffusion.

Figure 7:
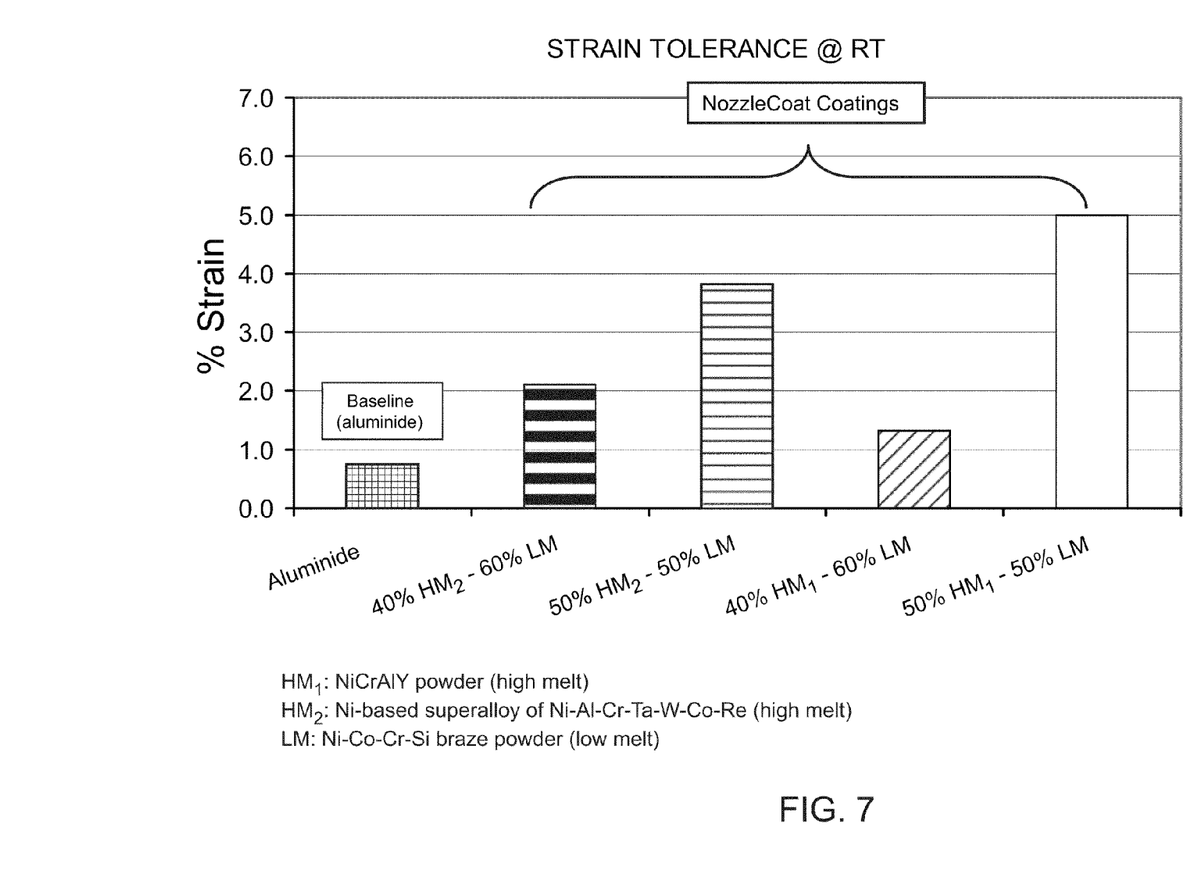
FIG. 7 is a strain/tolerance graph of four different alternative coating compositions used in the method according to the invention showing their respective levels of ductility (expressed as a percentage of strain) with the strain values determined at room temperature ("RT") and compared to a prior art baseline coating composition.

FIG. 7 depicts a strain/tolerance graphical representation (expressed as a percentage strain level) for four different alternative coating compositions showing their respective levels of ductility (expressed as a percentage of strain) with the strain values determined at room temperature ("RT") and compared to a prior art coating composition. The same composition labels have been applied to the different tested combinations of high and low melt components. FIG. 7 thus confirms that the strain-to-crack tests conducted on exemplary coating compositions according to the invention showed that the brazeable MCrAlY coating powders applied with a thermal spray technique have improved room temperature strain tolerance as compared to the baseline diffusion aluminide.

Figure 8:
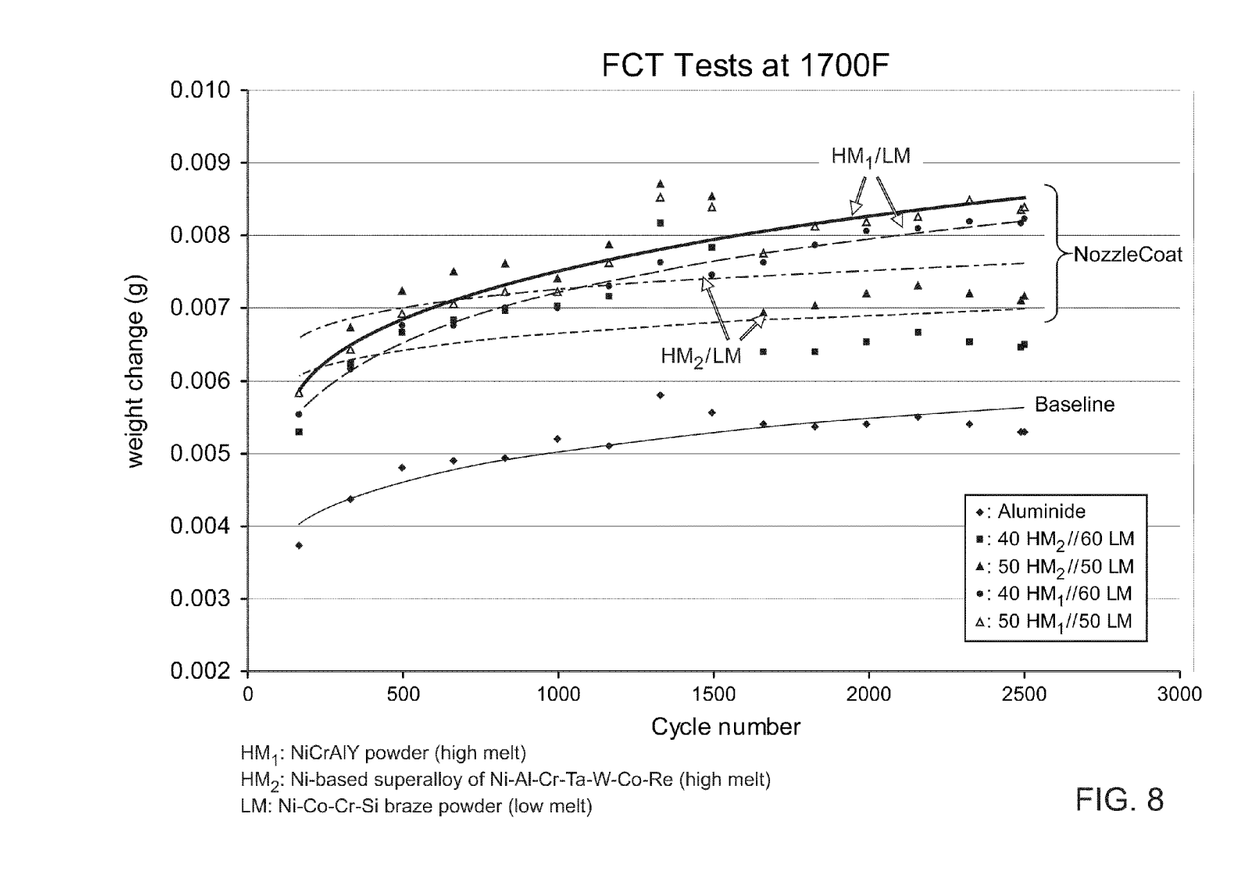
FIG. 8 is a graphical representation of the results of FCT tests conducted at 1700° F. for various coating compositions according to the invention plotting the weight change of the coatings at increasing cycle numbers compared to a baseline value representative of prior art coatings.

FIG. 8 is a graphical representation of the results of FCT tests conducted at 1700° F. for various coating compositions according to the invention plotting the weight change of the coatings at increasing furnace cycle numbers compared to a baseline value representative of the prior art. FIG. 8 represents in graphical form the weight change in grams of various coating compositions over an extended number of cycles. The various compositions are those identified above in other figures with common nomenclature. FIG. 8 also indicates that the rate of weight change (reflecting changes in oxidation) for the new compositions are superior to the baseline composition at higher cycle numbers.

Figure 9:
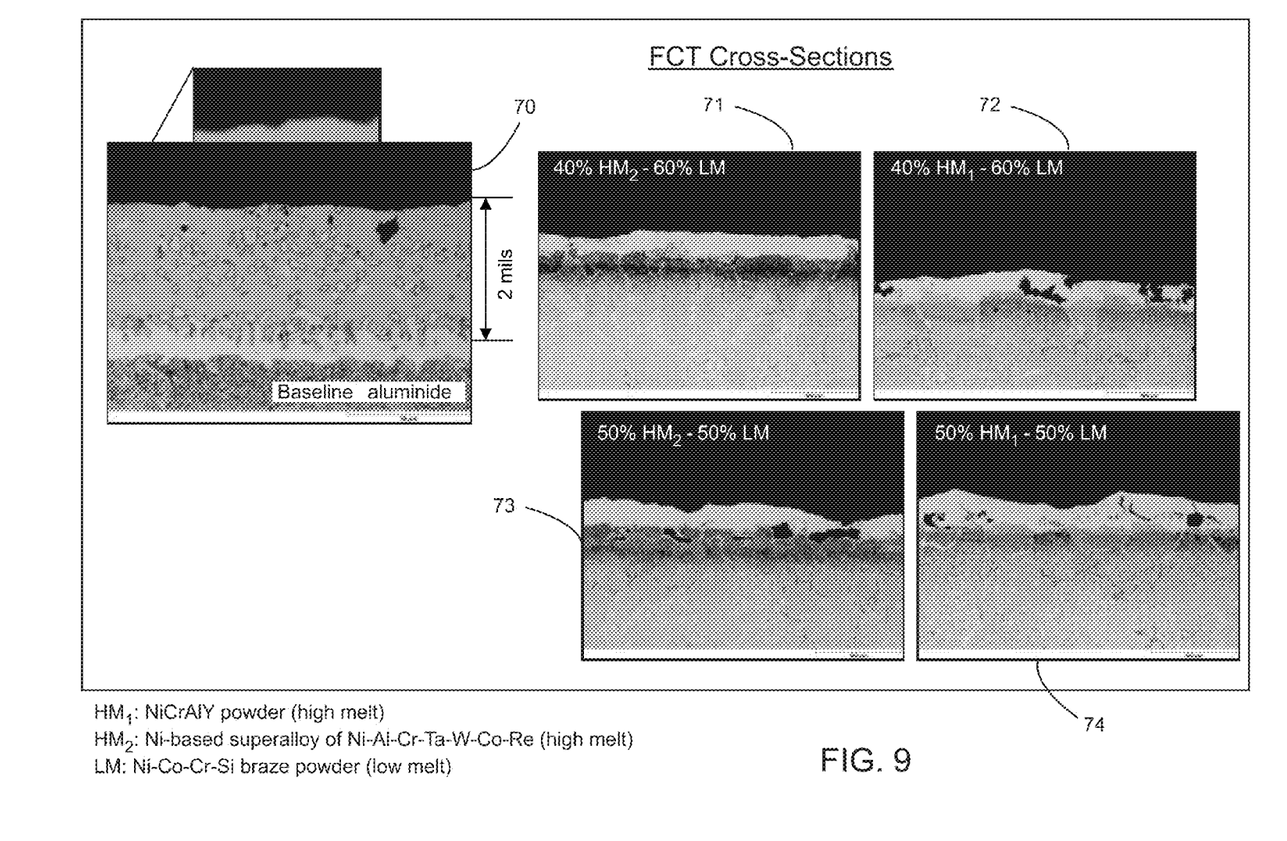
FIG. 9 is a series of photomicrographs showing the cross sections of exemplary coating compositions applied in accordance with the invention and tested as shown in FIG. 8.

FIG. 9 includes a series of photomicrographs showing the cross sections of exemplary coating compositions applied and tested with the oxidation test results over time as reflected in FIG. 8. The various images depict cross sections of test buttons as coated and heat treated after 2500 hours at 1700° F.

As noted above, the new method according to the invention offers significant advantages in terms of repair down time, cost and efficiency when used to coat turbine airfoils and other turbine components. The exemplary coating methods are much faster and easier to complete than conventional coating techniques and thus can be used to protect less critical components exposed to oxidation and corrosion environments, such as stage 2 and 3 turbine buckets, that typically do not receive HVOF or VPS quality coatings. The invention can also be used to efficiently coat static hardware components such as nozzles and shrouds or provide coatings to exterior combustion components to provide additional oxidation protection.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of coating a metal substrate on a gas turbine engine in order to increase the oxidation resistance of said substrate at high temperature, comprising the steps of:
    forming a powdered mixture of a high-melt superalloy component or MCrAlY, where M comprises Fe, Ni and/or Co, a lower-melting component containing a melting point depressant, said melting point depressant comprising silicon, boron, hafnium or gold, and a binder material for said powdered mixture;
    applying said powdered mixture to a surface of said metal substrate at room temperature using an atomized spray to form a coating of substantially uniform thickness on said substrate surface; and
    heating said coated substrate surface under vacuum conditions to a temperature in the range of about 1900° F. to 2275° F., said temperature and vacuum conditions being sufficient to liquefy said lower-melting component and remove said binder material and form a liquid phase in which the higher melting powders become suspended in said liquid phase and develop a metallurgical bond to said substrate by liquid phase sintering.

2. The method according to claim 1, wherein said step of heating said coated substrate surface occurs in stages such that the surface temperature is raised and lowered from a temperature of about 840° F. to about 2225° F. and back down to about 1975° F.

3. The method according to claim 2, wherein said step of heating said coated substrate surface in stages occurs over a period of about four to six hours.

4. The method according to claim 2, wherein said step of heating said coated substrate surface in stages occurs under vacuum conditions of about $5\times10^{-4}$ torr.

5. The method according to claim 2, wherein said step of heating said coated substrate surface under vacuum conditions achieves a level of porosity in the final heat-treated and coated surface of less than about 20%.

6. The method according to claim 1, wherein said lower-melting component comprises silicon in an amount of about 2-12 wt. %.

7. The method according to claim 1, wherein the amount of said high-melt component ranges from about 10% to about 60% by weight of said coating.

8. The method according to claim 1, wherein the amount of said low-melt component ranges from about 40% to about 90%.

9. A method according to claim 1, further comprising the step of mechanically finishing said coating on said metal substrate following said heating step.

10. The method according to claim 1, further comprising the step of increasing the surface temperature of said coating from about 1975° F. to about 2050° F.

11. The method according to claim 1, wherein said step of applying said powdered mixture covers only a portion of said metal substrate.

12. A method according to claim 1, further comprising the step of reducing the temperature by 15-20° F. following an initial heat treatment, the reduced temperature being sufficient to diffuse and homogenize the final coating composition applied to said substrate.

13. A method according to claim 1, wherein said powdered mixture comprises 50% by weight of Ni-8Cr-10Al and 50% Ni-12Cr-2Al-4Si.

14. A method according to claim 1, wherein step of heating said coated substrate surface under vacuum conditions occurs at a pressure maintained below $5\times10^{-4}$ torr and a constant heating rate of 15-25° F. per minute.

* * * * *

UNITED STATES PATENT AND TRADEMARK OFFICE
CERTIFICATE OF CORRECTION

PATENT NO. : 9,023,423 B2  
APPLICATION NO. : 12/574809  
DATED : May 5, 2015  
INVENTOR(S) : Bucci et al.

Page 1 of 1

It is certified that error appears in the above-identified patent and that said Letters Patent is hereby corrected as shown below:

In the Specification

At column 1, lines 38-39, change "electron beam physical vapor deposition (EEPVD)" to --electron beam physical vapor deposition (EBPVD)--

Signed and Sealed this  
Eighth Day of September, 2015

Michelle K. Lee  
*Director of the United States Patent and Trademark Office*